(12) United States Patent
Al-Harthi et al.

(10) Patent No.: US 8,722,821 B1
(45) Date of Patent: May 13, 2014

(54) METHOD OF MAKING POLYOLEFIN WITH A SILICON NITRIDE NANO-FILLER

(71) Applicant: King Fahd University of Petroleum and Minerals, Dhahran (SA)

(72) Inventors: Mamdouh Ahmed Al-Harthi, Dhahran (SA); Omer Bin Sohail, Dhahran (SA); Sadhan Kumar De, Dhahran (SA); Masiullah Jabarullah Khan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 13/846,866

(22) Filed: Mar. 18, 2013

(51) Int. Cl.
*C08F 4/44* (2006.01)
*B01J 31/38* (2006.01)
*C08F 2/44* (2006.01)

(52) U.S. Cl.
CPC ........................ *C08F 2/44* (2013.01)
USPC ........... 526/135; 526/170; 526/189; 526/348; 502/107; 502/123; 502/242

(58) Field of Classification Search
USPC .......... 526/135, 170, 189, 348; 502/107, 123, 502/242
See application file for complete search history.

(56) References Cited

U.S. PATENT DOCUMENTS

| | | | | |
|---|---|---|---|---|
| 2004/0209766 | A1* | 10/2004 | Atiqullah et al. | 502/131 |
| 2005/0020437 | A1* | 1/2005 | Winkler et al. | 502/118 |

FOREIGN PATENT DOCUMENTS

| | | |
|---|---|---|
| CN | 1317503 A | 10/2001 |
| CN | 1415633 A | 5/2003 |
| CN | 1453070 A | 11/2003 |
| GB | 1 527 613 | 10/1978 |
| JP | 61-263627 | 11/1986 |
| RU | 2 231 528 C2 | 6/2004 |
| RU | 2 290 405 C1 | 12/2006 |
| RU | 2 291 870 C1 | 1/2007 |
| TW | 200911874 | 3/2009 |

OTHER PUBLICATIONS

Zhou et al. ["A novel fiber-reinforced polyethylene composite with added silicon nitride particles for enhanced thermal conductivity", Composites Part A; Applied Science and Manufacturing (2009), vol. 40, Issues 6-7, pp. 830-836].*

Wenying Zhou et al., "A novel fiber-reinforced polyethylene composite with added silicon nitride particles for enhanced thermal conductivity", Composites Part A; Applied Science and Manufacturing (2009), vol. 40, Issues 6-7, pp. 830-836 (Abstract only).

* cited by examiner

*Primary Examiner* — Kelechi Egwim
(74) *Attorney, Agent, or Firm* — Richard C Litman

(57) ABSTRACT

The method of making polyolefin with a silicon nitride nano-filler uses silicon nitride (SiN) as a promoter for in situ polymerization with a zirconocene catalyst. The method includes adding the bis(cyclopentadienyl) zirconium dichloride catalyst and nanoparticles of silicon nitride to a reactor. The reactor is then charged with toluene and a methylaluminoxane co-catalyst, and is heated for a period of time sufficient to bring the reactor to a polymerization reaction temperature. Nitrogen gas is removed from the reactor following the heating, and then ethylene monomer is fed into the reactor, initiating polymerization. The polymerization is then quenched, and non-reacted monomer is vented. The polyolefin product is then removed from the reactor, washed and dried.

16 Claims, 1 Drawing Sheet

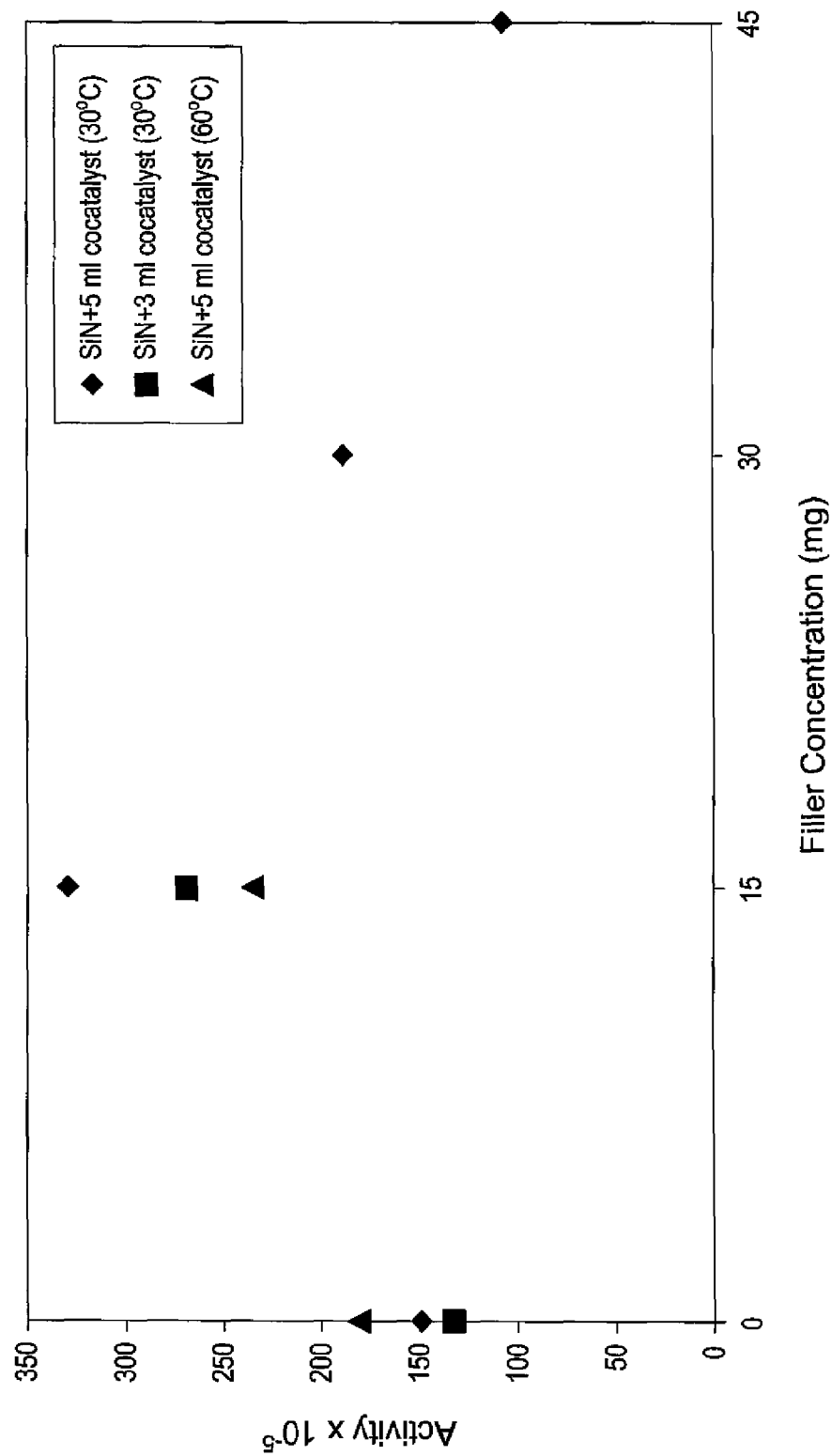

METHOD OF MAKING POLYOLEFIN WITH A SILICON NITRIDE NANO-FILLER

BACKGROUND OF THE INVENTION

1. Field of the Invention

The present invention relates to the manufacture of polyolefin nanocomposites, and particularly to a method of making polyolefin with a silicon nitride nano-filler using silicon nitride (SiN) as a promoter for in situ polymerization with a zirconocene catalyst.

2. Description of the Related Art

Ethylene polymerization is a well-known process, and is conventionally performed using free-radical polymerization, the Zeigler-Natta catalyst technique, the Phillips catalyst technique, the metallocene catalyst technique, and the post-metallocene catalyst technique. Polyolefin composites are of great interest due to their mechanical and thermal properties. It has been found that addition of nanoparticles, such as titanium dioxide, doped titanium, silicon dioxide, aluminum trioxide and zirconium dioxide, may improve the polymer properties of such composites.

The use of metallocene catalysts in the production of polyolefin composites is known. However, it would be desirable to provide a filler material to produce polyolefin composites with enhanced properties in which the filler material itself also increases the activity of the metallocene catalysts, thereby providing higher yield and higher molecular weight polyolefins. Thus, a method of making polyolefin with a silicon nitride nano-filler solving the aforementioned problems is desired.

SUMMARY OF THE INVENTION

The method of making polyolefin with a silicon nitride nano-filler uses silicon nitride (SiN) as a promoter for in situ polymerization with a zirconocene catalyst. The method includes adding bis(cyclopentadienyl) zirconium dichloride catalyst and silicon nitride to a reactor. The silicon nitride is in particulate or nano-particulate form to ultimately form the polyolefin composite with a nano-filler of silicon nitride. The silicon nitride also acts as a promoter of the polymerization reaction. The reactor is then charged with toluene and a methylaluminoxane (MAO) co-catalyst, and is heated for a period of time sufficient to bring the reactor to a polymerization reaction temperature. Nitrogen gas is removed from the reactor, following the heating, and then ethylene monomer is fed into the reactor, initiating polymerization. The polymerization is then quenched and non-reacted monomer is vented. The polyolefin composite product is then removed from the reactor, washed and dried.

These and other features of the present invention will become readily apparent upon further review of the following specification and drawings.

BRIEF DESCRIPTION OF THE DRAWINGS

The sole FIGURE is a graph illustrating polymerization activity as a function of silicon nitride concentration when using the method of making polyolefin with a silicon nitride nano-filler according to the present invention.

DETAILED DESCRIPTION OF THE PREFERRED EMBODIMENTS

The method of making polyolefin with a silicon nitride nano-filler uses silicon nitride (SiN) as a promoter for in situ polymerization with a zirconocene catalyst. The bis(cyclopentadienyl) zirconium dichloride catalyst and silicon nitride are first added to a reactor. In the following example, the silicon nitride used was silicon nitride nanopowder ($Si_3N_4$) furnished by Sigma Aldrich as spherical particles having a particle size less than 50 nanometers. In the experiment, the polymerization was performed in a 250 mL round-bottom flask equipped with a magnetic stirrer and thermometer. In the experiment, 6.0 mg of bis(cyclopentadienyl) zirconium dichloride was added to the reactor, with amounts of SiN varying from 0 mg to 45.0 mg. As will be described in greater detail below, 15 mg of SiN was found to produce the highest polymerization activity. The silicon nitride is in particulate or nano-particulate form to ultimately form the polyolefin composite with a nano-filler of silicon nitride. The silicon nitride also acts as a promoter of the polymerization reaction.

Following addition of the catalyst and the SiN to the reactor, the reactor was charged with about 80 mL of toluene and 5 mL of a methylaluminoxane co-catalyst. The reactor was then heated by immersion in a constant temperature bath for a period of time sufficient to bring the reactor to a polymerization reaction temperature (either 30° C. or 60° C., as shown in the trials of Table 1). Once equilibrium had been reached between the reactor and the bath, nitrogen gas was removed from the reactor under vacuum, followed by feeding ethylene monomer into the reactor at a pressure of about 1.0 bar for a period of about 30 minutes to saturate the toluene solvent, initiating polymerization. Polymerization occurred for about 30 minutes, after which the polymerization reaction was quenched by the addition of about 5 or 6 drops of acidic methanol. Non-reacted ethylene monomer was then vented from the reactor, leaving the polyolefin composite product. The polyolefin composite was washed with an excess amount of methanol and dried in vacuum at a temperature of about 50° C.

The polymerization activity and thermal properties of the reaction are given below in Table 1 for quantities of the SiN ranging between 0 and 45.0 mg, along with variations of the reaction temperature of 30° C. and 60° C.:

TABLE 1

Activity and Thermal Properties of the Polymerization Reaction

| Entry No. | Filler (mg)[a] | Temp (° C.) | Activity[d] | Time (min) | Tm (° C.) |
|---|---|---|---|---|---|
| 1 | 0[c] | 30 | 149.46 | 30 | 133.07 |
| 2 | 15 | 30 | 320.17 | 30 | 135.90 |
| 3 | 30 | 30 | 178.22 | 30 | 136.10 |
| 4 | 45 | 30 | 80.127 | 30 | 138.29 |
| 5 | 0[c] | 60 | 181.15 | 30 | 131.26 |
| 6 | 15 | 60 | 267.67 | 30 | 129.44 |
| 7 | 0[b,c] | 30 | 132.80 | 30 | 132.50 |
| 8 | 15[b] | 30 | 207.13 | 30 | 135.03 |

[a] AlN
[b] with less amount of MAO
[c] Control
[d] $\times 10^{-5}$ gPE/mol Zr h bar As can be seen in Table 1, the polymerization activity of the $Cp_2ZrCl_2$ catalyst was greatest with a value of $320.17 \times 10^{-5}$ gPE/mol Zr h bar when using 15 mg of the SiN promoter. Increasing the reaction temperature to 60° C. was found to decrease the activity of the catalysts, although it should be noted that, even at the reaction temperature of 60° C., polymerization activity was still found to be increased compared to the control through the addition of the SiN promoter. These results are also plotted in the sole FIGURE.

A differential scanning calorimeter was used to determine the thermal characteristics of the resultant polyolefin. As shown in the first entry of Table 1, the control sample has a melting point (Tm) of 133.07° C., which is slightly lower than the 135.90° C. melting temperature of the sample using 15 mg of SiN. Thus, in addition to a higher polymerization activity, the thermal stability of the end product is also increased.

It is to be understood that the present invention is not limited to the embodiments described above, but encompasses any and all embodiments within the scope of the following claims.

We claim:

1. A method of making polyolefin with a silicon nitride nano-filler, comprising the steps of:
    adding a bis(cyclopentadienyl)zirconium dichloride catalyst and silicon nitride filler mixture to a reactor, wherein the silicon nitride filler comprises approximately 71.4 wt % of the mixture;
    charging the reactor with toluene and methylaluminoxane co-catalyst;
    heating the reactor for a period of time sufficient to bring the reactor to a polymerization reaction temperature;
    feeding an olefin monomer into the reactor to initiate in situ polymerization;
    quenching the polymerization; and
    removing a polyolefin product from the reactor.

2. The method of making polyolefin according to claim 1, wherein the olefin monomer comprises ethylene, the polyolefin product being polyethylene.

3. The method of making polyolefin as recited in claim 1, wherein the step of quenching the polymerization comprises adding acidic methanol to the reactor.

4. The method of making polyolefin as recited in claim 1, further comprising the step of removing nitrogen from the reactor prior to the step of feeding polyolefin monomer into the reactor.

5. The method of making polyolefin as recited in claim 1, wherein said step of feeding polyolefin monomer into the reactor comprises feeding ethylene monomer into the reactor at a pressure of about 1.0 bar for a period of about 30 minutes.

6. The method of making polyolefin as recited in claim 1, wherein the polymerization reaction temperature is about 30° C.

7. The method of making polyolefin as recited in claim 1, wherein the silicon nitride filler comprises particles of silicon nitride having a size less than 50 nm.

8. A method of making polyethylene, comprising the steps of:
    adding a mixture of zirconocene catalyst and nanoparticles of silicon nitride filler to a reactor, wherein the silicon nitride filler comprises approximately 71.4 wt % of the mixture;
    charging the reactor with organic solvent and an effective amount of methylaluminoxane (MAO) co-catalyst;
    heating the reactor for a period of time sufficient to bring the reactor to a polymerization reaction temperature;
    feeding ethylene monomer into the reactor to initiate in situ polymerization;
    quenching the polymerization; and
    removing polyethylene product from the reactor.

9. The method of making polyethylene as recited in claim 8, wherein the polymerization reaction temperature is about 30° C.

10. The method of making polyethylene as recited in claim 8, wherein the polymerization reaction temperature is about 60° C.

11. The method of making polyethylene as recited in claim 8, wherein the step of quenching the polymerization comprises adding acidic methanol to the reactor.

12. The method of making polyethylene as recited in claim 8, further comprising the step of removing nitrogen from the reactor prior to the step of feeding ethylene monomer into the reactor.

13. The method of making polyethylene as recited in claim 8, wherein said step of feeding ethylene monomer into the reactor comprises feeding ethylene monomer into the reactor at a pressure of about 1.0 bar until the organic solvent is saturated.

14. The method of making polyethylene as recited in claim 8, wherein the organic solvent comprises toluene.

15. Polyethylene made according to the method of claim 8.

16. The method of making polyethylene as recited in claim 8, wherein the nanoparticles of silicon nitride filler have a particle size less than 50 nm.

* * * * *